United States Patent
Seo et al.

(10) Patent No.: US 12,481,687 B2
(45) Date of Patent: Nov. 25, 2025

(54) OPERATION METHOD AND ELECTRONIC DEVICE FOR GENERATING AND USING FILENAME METADATA INCLUDING ENCRYPTED CASE INSENSITIVE FILENAME

(71) Applicant: Samsung Electronics Co., Ltd., Suwon-si (KR)

(72) Inventors: Sungjong Seo, Suwon-si (KR); Yeongjin Gil, Suwon-si (KR); Hyeongjun Kim, Suwon-si (KR); Woojoong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/735,971

(22) Filed: Jun. 6, 2024

(65) Prior Publication Data

US 2024/0330339 A1 Oct. 3, 2024

Related U.S. Application Data

(63) Continuation of application No. PCT/KR2022/017822, filed on Nov. 14, 2022.

(30) Foreign Application Priority Data

Dec. 16, 2021 (KR) .................. 10-2021-0180513
Jan. 3, 2022 (KR) .................. 10-2022-0000422

(51) Int. Cl.
*G06F 16/334* (2025.01)
*G06F 16/335* (2019.01)

(52) U.S. Cl.
CPC .......... *G06F 16/334* (2019.01); *G06F 16/335* (2019.01)

(58) Field of Classification Search
CPC .................... G06F 16/334; G06F 16/335
See application file for complete search history.

(56) References Cited

U.S. PATENT DOCUMENTS 7,676,491 B2  3/2010  Jansen et al.
7,941,435 B2  5/2011  Kao et al.
(Continued)

FOREIGN PATENT DOCUMENTS

KR  20090108849 A  10/2009
KR  101496347 B1   2/2015

OTHER PUBLICATIONS

International Search Report for PCT/KR2022/017822 mailed Feb. 22, 2023, 6 pages.
(Continued)

*Primary Examiner* — Hares Jami
(74) *Attorney, Agent, or Firm* — Nixon & Vanderhye P.C.

(57) ABSTRACT

An electronic device in an example embodiment may include a communication interface configured to receive an original file, a memory, and a processor. The processor may generate bit information corresponding to uppercase and lowercase letters included in a filename of the original file. The processor may generate a case insensitive (CI) filename in which the filename of the original file is expressed by characters of a first type. The processor may encrypt the CI filename and may calculate a first hash value corresponding to the encrypted CI filename. The processor may record filename metadata including at least one of the encrypted CI filename, a length of the encrypted CI filename, the first hash value, and the bit information, in the memory. The processor may search for a target file to be found based on the filename metadata.

15 Claims, 12 Drawing Sheets

(56) References Cited

U.S. PATENT DOCUMENTS

| | | | |
|---|---|---|---|
| 8,060,521 B2* | 11/2011 | Lemar | G06F 16/166 |
| | | | 707/822 |
| 8,321,439 B2 | 11/2012 | Pudipeddi et al. | |
| 9,176,972 B1* | 11/2015 | Schouten | G06F 16/16 |
| 10,515,052 B2 | 12/2019 | Wang et al. | |
| 10,534,753 B2 | 1/2020 | Avati et al. | |
| 10,885,215 B2 | 1/2021 | Greatwood | |
| 10,977,315 B2 | 4/2021 | Dupont et al. | |
| 2009/0164440 A1* | 6/2009 | Pudipeddi | G06F 16/152 |
| 2011/0078219 A1* | 3/2011 | Dodge | G06F 16/172 |
| | | | 707/822 |
| 2015/0227535 A1* | 8/2015 | Avati | G06F 16/116 |
| | | | 707/741 |
| 2018/0144152 A1 | 5/2018 | Greatwood | |
| 2019/0026301 A1* | 1/2019 | Wang | G06F 16/152 |
| 2020/0142860 A1 | 5/2020 | Avati et al. | |
| 2020/0279003 A1 | 9/2020 | Dupont et al. | |

OTHER PUBLICATIONS

Written Opinion of the ISA for PCT/KR2022/017822 mailed Feb. 22, 2023, 4 pages.

* cited by examiner

OPERATION METHOD AND ELECTRONIC DEVICE FOR GENERATING AND USING FILENAME METADATA INCLUDING ENCRYPTED CASE INSENSITIVE FILENAME

CROSS-REFERENCE TO RELATED APPLICATIONS

This application is a continuation application of International Application No. PCT/KR2022/017822 designating the United States, filed on Nov. 14, 2022, in the Korean Intellectual Property Receiving Office and claiming priority to Korean Patent Application No. 10-2021-0180513, filed on Dec. 16, 2021, and 10-2022-0000422, filed Jan. 3, 2022, in the Korean Intellectual Property Office, the disclosures of which are all hereby incorporated by reference herein in their entireties.

BACKGROUND

Technical Field

Certain example embodiments relate to an operating method of an electronic device for file search and/or such an electronic device.

Description of Related Art

Typically, a method of handling a filename by a file system may be divided into two types. One of them is a case exact (CE) method of distinguishing between uppercase and lowercase letters and recognizing as different files when uppercase and lowercase letters of a filename are different, and the other one is a case insensitive (CI) method of recognizing as a same file without distinguishing between uppercase and lowercase letters when uppercase and lowercase letters of a filename are different. For example, when a file system of a mobile device encrypts a filename to protect a user file recorded in a permanent storage device, a method and a processing operation of the file system may vary by comparing a filename according to a method of handling the filename.

SUMMARY

For example, to compare filenames processed in a case insensitive (CI) manner, a process of converting a filename of an original file into characters of one type, such as lowercase letters or uppercase letters, may be performed. In addition, to compare filenames encrypted in the CI manner, a decryption process may be performed. When processing a filename in the CI manner, a cost may increase because many processing resources are used for conversion and comparison of filenames, and thus, the cost may be reduced by using a hash value while search performance of an encrypted file may be improved.

Since a typical file system consistency verification is conducted in a state in which an encryption key is not input, the corruption of a hash value may not be determined when filename decryption is required to calculate the hash value. Therefore, verification of the hash value may be skipped. When the hash value is corrupted, even though an actual file is stored in a storage, data may be lost because the file may not be permanently found. In addition, when a collision among hash values frequently occurs, encryption for an on disk filename, which is an encrypted name for a case exact (CE) filename, and CI filename conversion may be iteratively performed.

Various example embodiments may calculate a hash value with a filename stored in an on-disk without an encryption key by using a hash value for an encrypted CI filename of an original file.

Various example embodiments may detect corruption of a hash value for a filename without an encryption key by using a hash value for an encrypted CI filename of an original file and may reconstruct a corrupted hash value.

According to an example embodiment, an electronic device may include a communication interface, comprising communication circuitry, configured to receive an original file, a memory, and at least one processor comprising processing circuitry, wherein the at least one processor is individually and/or collectively configured to generate bit information corresponding to uppercase and lowercase letters included in a filename of the original file, generate a case insensitive (CI) filename in which the filename of the original file is expressed by characters of a first type, encrypt the CI filename, calculate a first hash value corresponding to the encrypted CI filename, record filename metadata including at least one of the encrypted CI filename, a length of the encrypted CI filename, the first hash value, and the bit information, in the memory, and search for a target file to be found based on the filename metadata.

According to an example embodiment, a method of operating an electronic device may include generating bit information corresponding to uppercase and lowercase letters included in a filename of an original file, generating a CI filename in which the filename of the original file is expressed by characters of a first type, encrypting the CI filename, calculating a first hash value corresponding to the encrypted CI filename, recording filename metadata including at least one of the encrypted CI filename, a length of the encrypted CI filename, the first hash value, and the bit information, in a memory, and searching for a target file to be found based on the filename metadata.

Effects

An electronic device according to an example embodiment may reconstruct an original filename by separately storing the original filename into a CI filename and bit information corresponding to uppercase and lowercase letters included in the original filename as well as may improve search performance and reliability as shown below.

An electronic device according to an example embodiment may improve the search performance without an additional decryption cost when hash values collide.

An electronic device according to an example embodiment may guarantee the search performance for a filename by using a hash value for an encrypted CI filename of an original file.

An electronic device according to an example embodiment may detect corruption of a hash value included in filename metadata by calculating a hash value with an encrypted CI filename stored in a storage device without an encryption key and may recover the corrupted hash value.

An electronic device according to an example embodiment may detect corruption of a hash value without performing a decryption process through a key value for a filename of an original file by storing uppercase and lowercase letter information about the filename of the original file separately from the filename and may improve reconstruction stability by recovering the corrupted hash value.

In addition, various effects directly or indirectly ascertained through the present disclosure may be provided.

DETAILED DESCRIPTION

Figure 1:
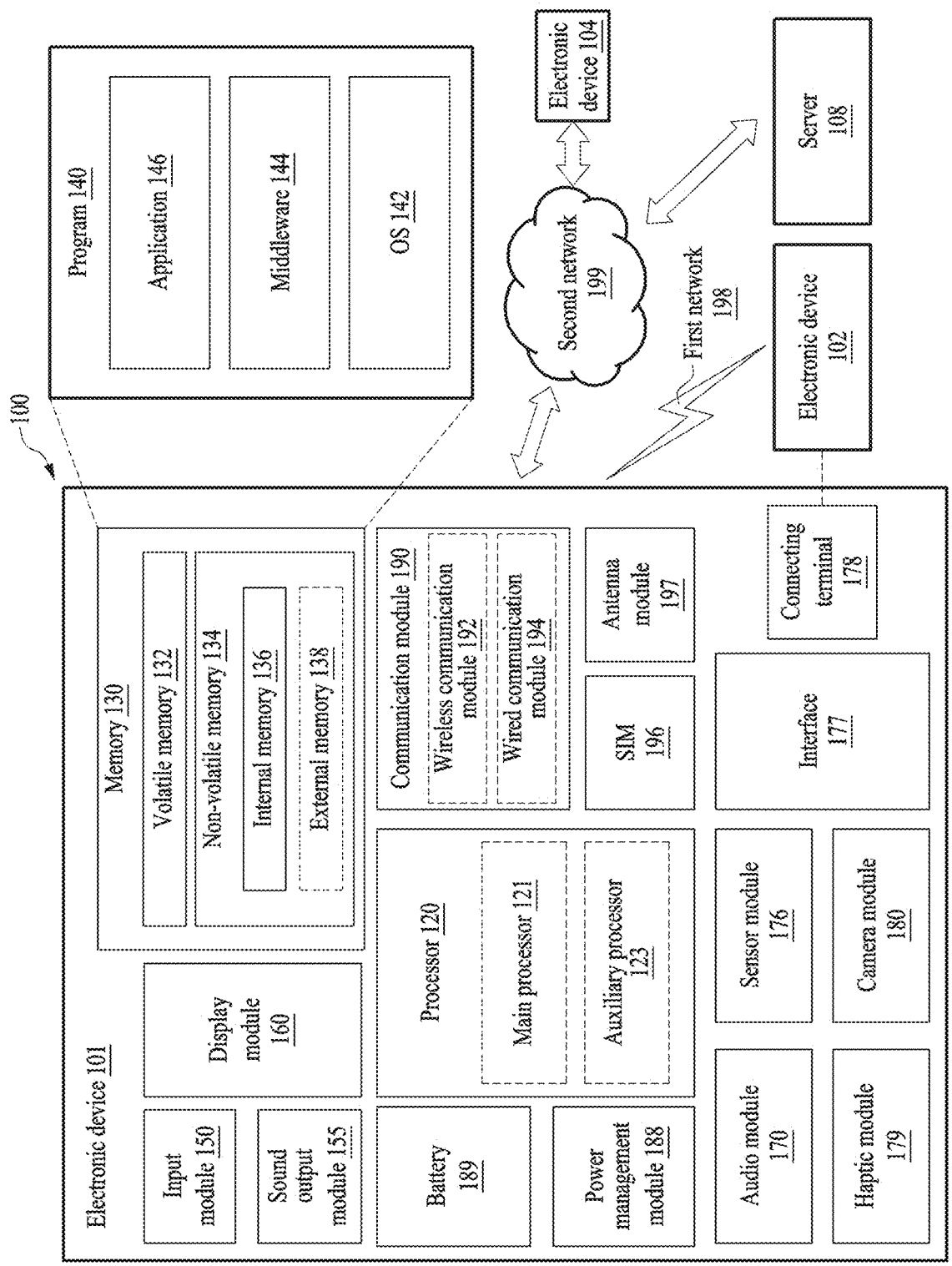
FIG. 1 is a block diagram illustrating an electronic device in a network environment according to an example embodiment.

Hereinafter, example embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neuralprocess network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electrical signal or vice versa. According to an example embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal Into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190, comprising communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an example embodiment, the antenna module 197 may form a mm Wave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., a mm Wave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
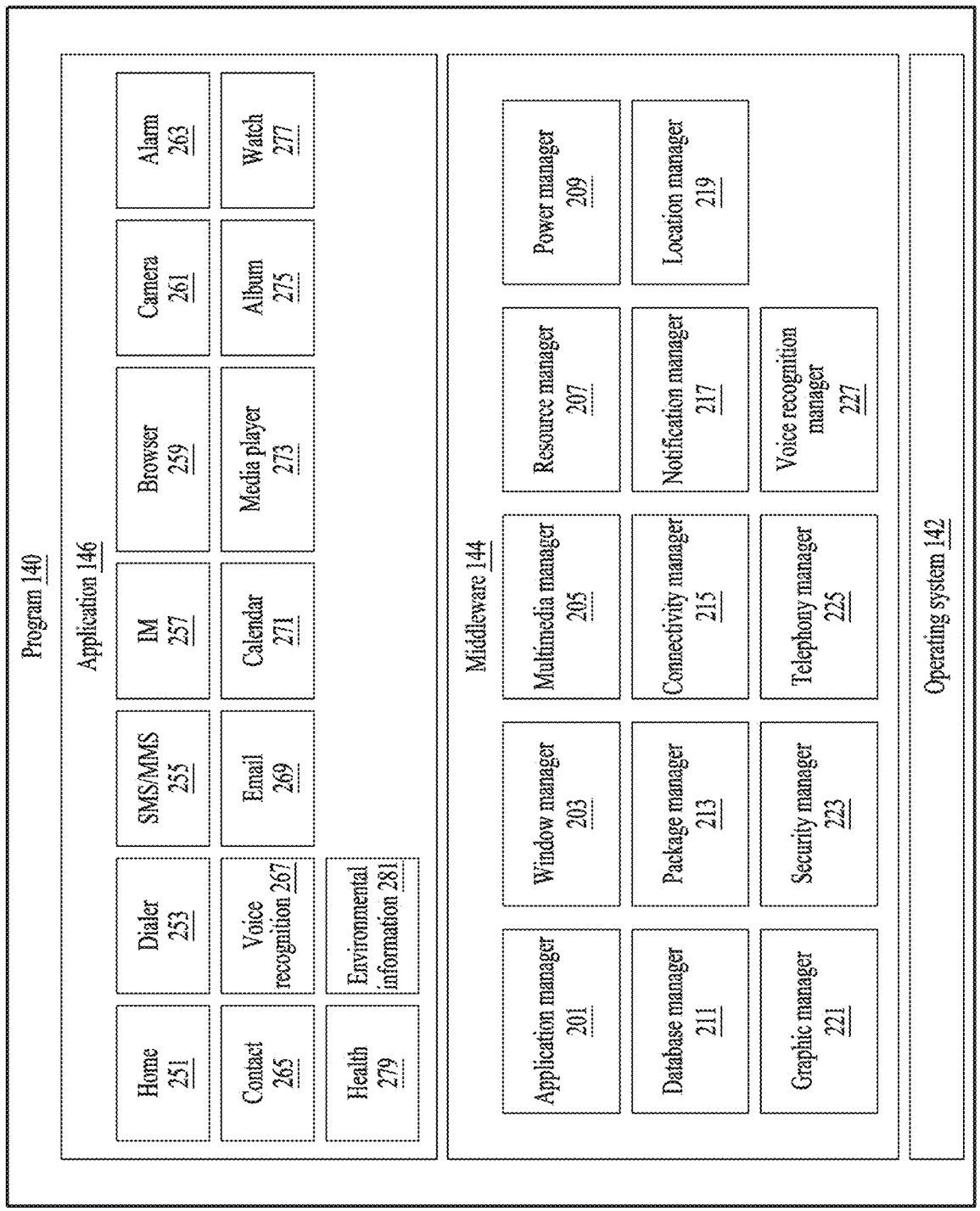
FIG. 2 is a block diagram illustrating a program according to an example embodiment.

FIG. 2 is a block diagram 200 illustrating a program 140 according to an example embodiment. According to an example embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include at least one other drive program to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit use's voice data to the server 108, and may receive, from the server 108, a command corresponding to a function to be executed on the electronic device 101 based on at least in part on the voice data, or text data converted based on at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101, or some component (e.g., a display module or a camera module of the external electronic device) of the external electronic device. The device management application may additionally or alternatively support the installation, deletion, or update of an application being operated on an external electronic device.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, ""A or"", ""at least one of A and"", ""at least one of A or"", ""A, B or"", ""at least one of A, B and"", and ""A, B, or C"" each of which may include any one of the items listed together in the corresponding one of the phrases, or all possible combinations thereof. Term" such as "first", "second", or "first" or "second" may simply be used to distinguish the component from other components in question, and may refer to components in other aspects (e.g., importance or order) is not limited. It is to be understood that if an element (e.g., a first element) is referred to, with or without the term ""operativel"" or ""communicativel"", as ""coupled with"" ""coupled to"" ""connected with"" or ""connected to"" another element (e.g., a second element), it means that the element may be coupled with the other element directly (e.g., wiredly), wirelessly, or via at least a third element(s).

As used in connection with embodiments of the disclosure, the term ""module"" may include a unit implemented in hardware, software, or firmware, and may interchangeably be used with other terms, for example, ""logic"" ""logic block"" ""part"" or ""circuitry"" A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Embodiments as set forth herein may be implemented as software (e.g., the program 140) including one or more instructions that are stored in a storage medium (e.g., an internal memory 136 or an external memory 138) that is readable by a machine (e.g., the electronic device 101 of FIG. 1). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term ""non-transitory"" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacture's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
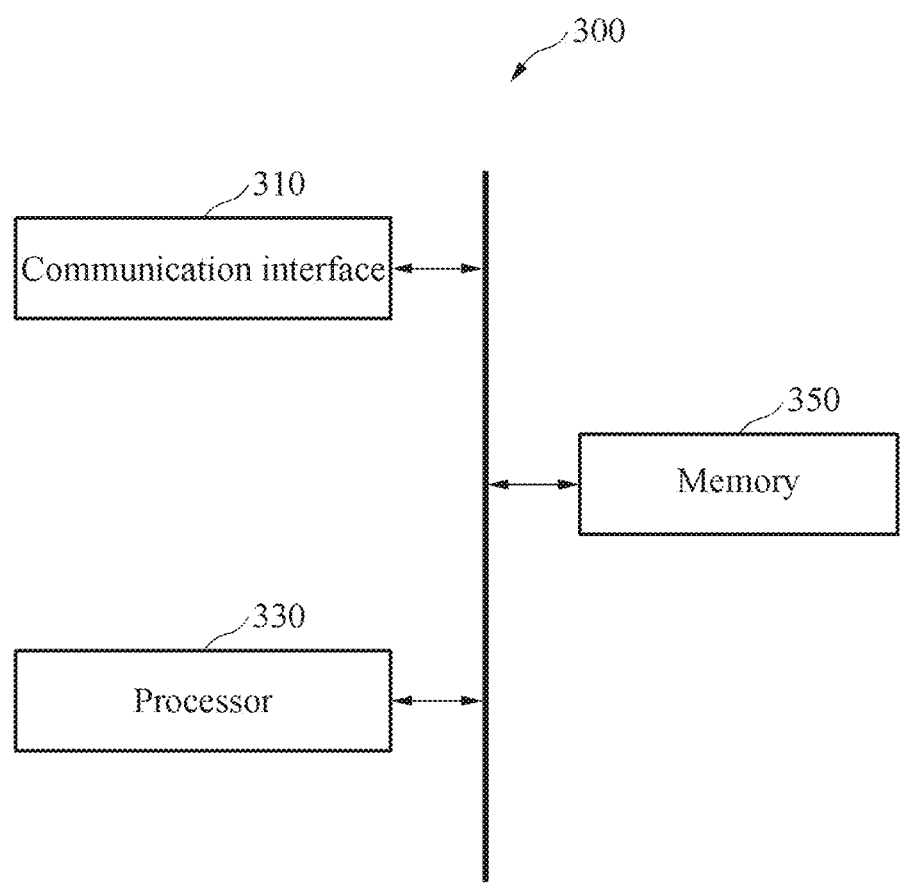
FIG. 3 is a block diagram illustrating an electronic device according to an example embodiment.

FIG. 3 is a block diagram illustrating an electronic device according to an example embodiment. Referring to FIG. 3, an electronic device 300 (e.g., the electronic device 101 of FIG. 1) according to an example embodiment may include a communication interface 310 (e.g., the communication module 190 of FIG. 1), a processor 330 (e.g., the processor 120 of FIG. 1), and a memory 350 (e.g., the memory 130 of FIG. 1). The communication interface 310, the processor 330, and the memory 350 may be connected, directly or indirectly, via a communication bus (not shown).

The communication interface 310 may receive an original file. The original file may be, for example, a file to be stored in the memory 350 or a storage device (e.g., a storage device 670 of FIG. 6) through a file system (e.g., a file system of FIG. 6) included by an OS (e.g., the OS 142 of FIGS. 1 and 2) of the electronic device 300 or a file to be searched for or to be verified. However, the example is not limited thereto.

The processor 330 may generate bit information corresponding to uppercase and lowercase letters included in a filename of the original file. For example, the processor 330 may generate the bit information by allocating a first bit value in correspondence to a position of an uppercase letter included in the filename of the original file and allocating a second bit value in correspondence to a position of a lowercase letter included in the filename of the original file. For example, the first bit value may be """"and the second bit value may be """"". Also conversely, the first bit value may be """"and the second bit value may be """"". Hereinafter, for ease of description, the filename of the original file may be referred to as an """"original filenam"""".

The processor 330 may generate a case insensitive (CI) filename that represents the filename of the original file as characters of a first type. The characters of the first type may include, for example, one of uppercase letters and lowercase letters. In this case, the """"CI filenam"""" may be a filename in which the original filename is converted into character strings in one type, such as an uppercase letter and a lowercase letter.

The processor 330 may encrypt the CI filename. The processor 330 may encrypt the CI filename by various known encryption algorithms. The encryption algorithm may include, for example, a block encryption algorithm and a stream encryption algorithm. However, the example is not limited thereto.

The processor 330 may calculate a first hash value corresponding to the encrypted CI filename. For example, the first hash value may be calculated by a first hash function. The """"hash functio"""" may be a function that maps data having an arbitrary length to data of a fixed length. The hash function may be referred to as a """"hash algorith"""" or a """"hash generato"""".

Each "processor" herein includes processing circuitry, and/or may include multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In this case, a value of original data before hash mapping may be referred to as a""""ke"""" and a value of data after mapping may be referred to as a""""hash valu"""". For example, the """"hash valu"""" may correspond to a value of data of a fixed length calculated by applying the hash function. The hash function may be of various types and each hash function may have a different length of a hash value. The hash value may be referred to as hash code or a hash sum.

The processor 330 may record filename metadata Iding at least one of the encrypted CI filename, the length of the encrypted CI filename, the first hash value, and the bit information, in the memory 350. A process of recording a filename by the processor 330 and an embodiment of searching for a filename are further described with reference to FIG. 4.

For example, the processor 330 may record the filename metadata in different metadata areas in the memory 350 by attribute or item or may store the filename metadata in the same metadata area in the memory 350. Hereinafter, the memory 350 may be, for example, a certain storage space of the memory 350 provided for a file system and may be collectively construed as a separate storage device, such as a cloud server or an external hard drive. An embodiment of the file system is further described with reference to FIG. 6 below.

For example, from the filename metadata, the processor 330 may record the encrypted CI filename, the length of the encrypted CI filename, and the first hash value in a directory entry area of the original file. In addition, from the filename metadata, the processor 330 may separately record the bit information in a space (e.g., an i-node space) for storing a file attribute of the original file or an extra attributes space. An embodiment of the space for storing a file attribute or the extra attributes space is further described with reference to FIG. 5 below.

The processor 330 may search for a target file to be found based on the filename metadata recorded in the memory 350. In this case" the "me" adata" may correspond to information accompanying data to analyze and classify structured information about the data and add additional information, and may be, for example, data for data." The "filename me" adata" may be construed as data assigned to a filename according to a predetermined rule to efficiently find and use the filename. An example of the filename metadata is further described with reference to FIG. 8A below. The processor 330 may generate a second CI filename in which a filename of a target file is expressed by characters of the first type. The processor 330 may encrypt the second CI filename. The processor 330 may calculate a second hash value corresponding to the encrypted second CI filename. The processor 330 may perform a first comparison whether the first hash value coincides with the second hash value. The processor 330 may search for the target file based on a first comparison result.

For example, when the first comparison result coincides, the processor 330 may perform a second comparison of a filename length and a character string between the encrypted CI filename recorded in the memory 350 and the encrypted second CI filename. The processor 330 may search for the target file based on a second comparison result. For example, when the second comparison result coincides, the processor 330 may reconstruct the filename of the original file. When the second comparison result coincides, the processor 330 may reconstruct the filename of the original file by converting a character of the CI filename corresponding to an order of bits included in the bit information into an uppercase letter or a lowercase letter according to the bit information.

On the other hand, when the second comparison result does not coincide, the processor 330 may iteratively compare whether hash values corresponding to remaining filenames stored in the memory 350 coincide with the second hash value. When the second comparison result does not coincide, the processor 330 may iteratively compare whether the hash values coincide. When a third hash value, which is one of the hash values, coincides with the second hash value, the processor 330 may perform a third comparison of a filename length and a character string between an encrypted third CI filename corresponding to the third hash value and the encrypted second CI filename. Various embodiments of a method of searching for a search file by the processor 330 are further described with reference to FIGS. 9 and 10 below.

The memory 350 may store filename metadata generated by the processor 330. In this case, the filename metadata may correspond to the original file received through the communication interface 310.

In addition, the processor 330 may perform at least one method described with reference to FIGS. 1 to 11 or a scheme corresponding to the at least one method. The processor 330 may be a hardware-implemented optimization device having a physically structured circuit to execute desired operations. For example, the desired operations may include code or instructions in a program. The hardware-implemented electronic device 300 may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The memory 350 may store at least one program. The memory 350 may store a variety of information generated from processing by the processor 330. In addition, the memory 350 may store a variety of data and programs. The memory 350 may include, for example, a volatile memory (e.g., the volatile memory 132 of FIG. 1) or a non-volatile memory (e.g., the non-volatile memory 134 of FIG. 1). The memory 350 may include a high-capacity storage medium such as a hard disk to store a variety of data.

Figure 4A:
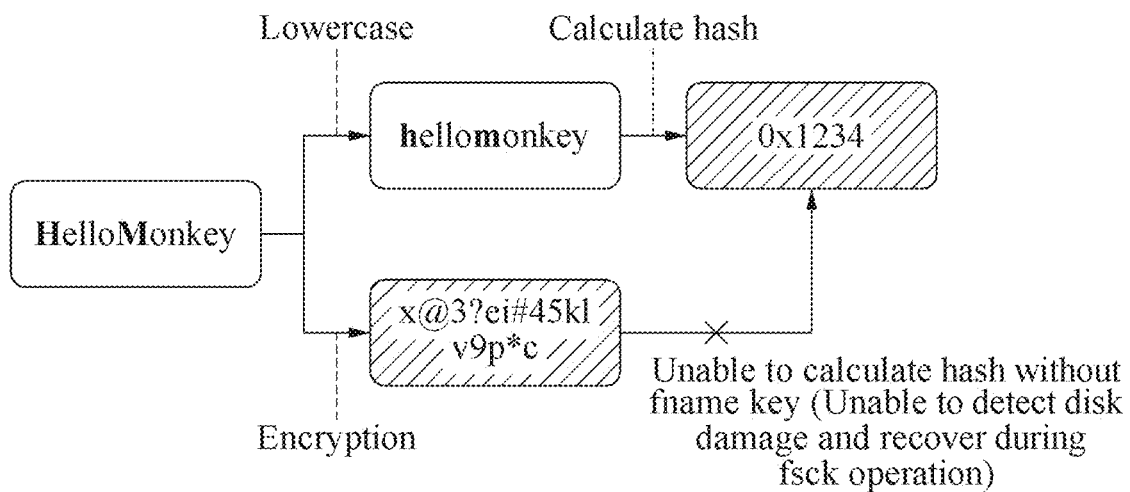
FIGS. 4A to 4C are diagrams illustrating a process of storing a filename and a process of searching for a file name according to an example embodiment.
Figure 4B:
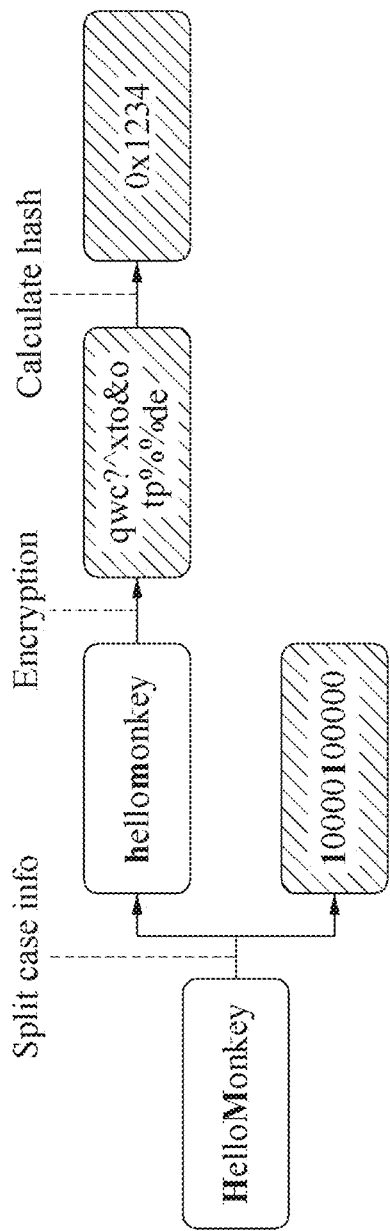
Figure 4C:
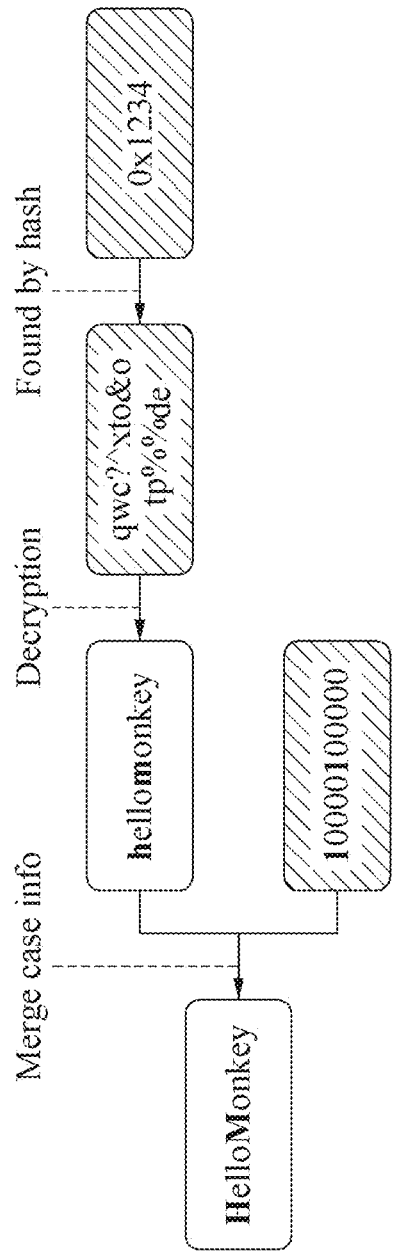

FIGS. 4A to 4C are diagrams illustrating a process of storing a filename and a process of searching for a file name according to an example embodiment.

Referring to FIG. 4A, a process in which a typical file system stores a filename of which uppercase and lowercase letters are distinguished is illustrated. For example, a fil "name "Hello" onkey" of an original file may be encrypted and stored and a hash value (".g., ""x1234") may be calculated by applying a hash function to a fil "name "hello" onkey" obtained by converting the fil "name "Hello" onkey" of the original file into lowercase letters. In this case, the fil "name "Hello" onkey" of the original file may be encrypted as a character string (".g., "x@3?ei #45k"v9p*c"). In addition, after the fil "name "Hello" onkey" of the original file is converted into lowercase le"ters "hello" onkey", the hash value (".g., ""x1234") corresponding to the lowercase le "ters "hello" onkey" may be calculated.

In this case, since a hash value of the encrypted character string (".g., "x@3?ei #45k"v9p*c") of the original file is different from a hash value of the lowercase le "ters "hello" onkey", the hash value of the lowercase fil"name "hello" onkey" of the original file may not be calculated without a key of the filename of the original file. For example, without the key value of the filename of the original file, corruption of the hash value may not be detected or the filename of the original file may not be reconstructed. FIG. 4B illustrates a case in which an electronic device (e.g., the electronic device 101 of FIG. 1 and the electronic device 300 of FIG. 3) according to an example embodiment converts a filename (".g., "Hello" onkey") of an original file into lowercase letters (".g., "hello" onkey") and separately stores uppercase and lowercase letter information (".g., "10000"00000") corresponding to the filename converted into lowercase letters (".g., "hello" onkey") from the filename.

The electronic device 300 may obtain an encrypted character string (".g., "qwc?ˆxto&o"p % % de") by performing encryption on the lowercase letters (".g., "hello" onkey") and may calculate a hash value (".g., ""x1234") for the encrypted character s"ring "qwc?ˆxto&o"p % % de". In this case, the hash value may be a hash value for an encrypted character string converted into lowercase letters and information about uppercase and lowercase letters of the filename of the original file may be separately stored. The electronic device 300 may obtain a filename converted into lowercase letters through a decryption process using a key (e.g., fname_key) value of the filename and may reconstruct the filename converted into lowercase letters to the filename of the original file by the uppercase and lowercase letter information.

FIG. 4C illustrates a case in which the electronic device 300 according to an example embodiment reconstructs a filename (".g., "hello" onkey") expressed by lowercase letters by decrypting an encrypted character string (".g., "qwc?^xto&o"p % % de") using a key (e.g., fname_key) value of the filename.

The electronic device 300 may determine whether a file to be found (searched for) is searched by reconstructing a filename (".g., "Hello" onkey") of an original file by reflecting uppercase and lowercase letter information (".g., "10000"00000") stored separately from the filename in a fil "name "hello" onkey" expressed by lowercase letters.

In an example embodiment, by storing the uppercase and lowercase letter information about the filename of the original file separately from the filename, the search performance may be improved by searching for a filename without distinguishing between uppercase and lowercase letters in an environment where encryption of a filename is performed to protect a user file recorded in a memory (e.g., the memory 130 of FIG. 1, the memory 350 of FIG. 3, and a storage device 670 of FIG. 6) of the electronic device 300.

In addition, in an example embodiment, by storing the uppercase and lowercase letter information about the filename of the original file separately from the filename, corruption of the hash value may be detected without performing a decryption process through a key value with respect to the filename of the original file and the reconstruction stability may be improved by recovering the corrupted hash value.

Figure 5:
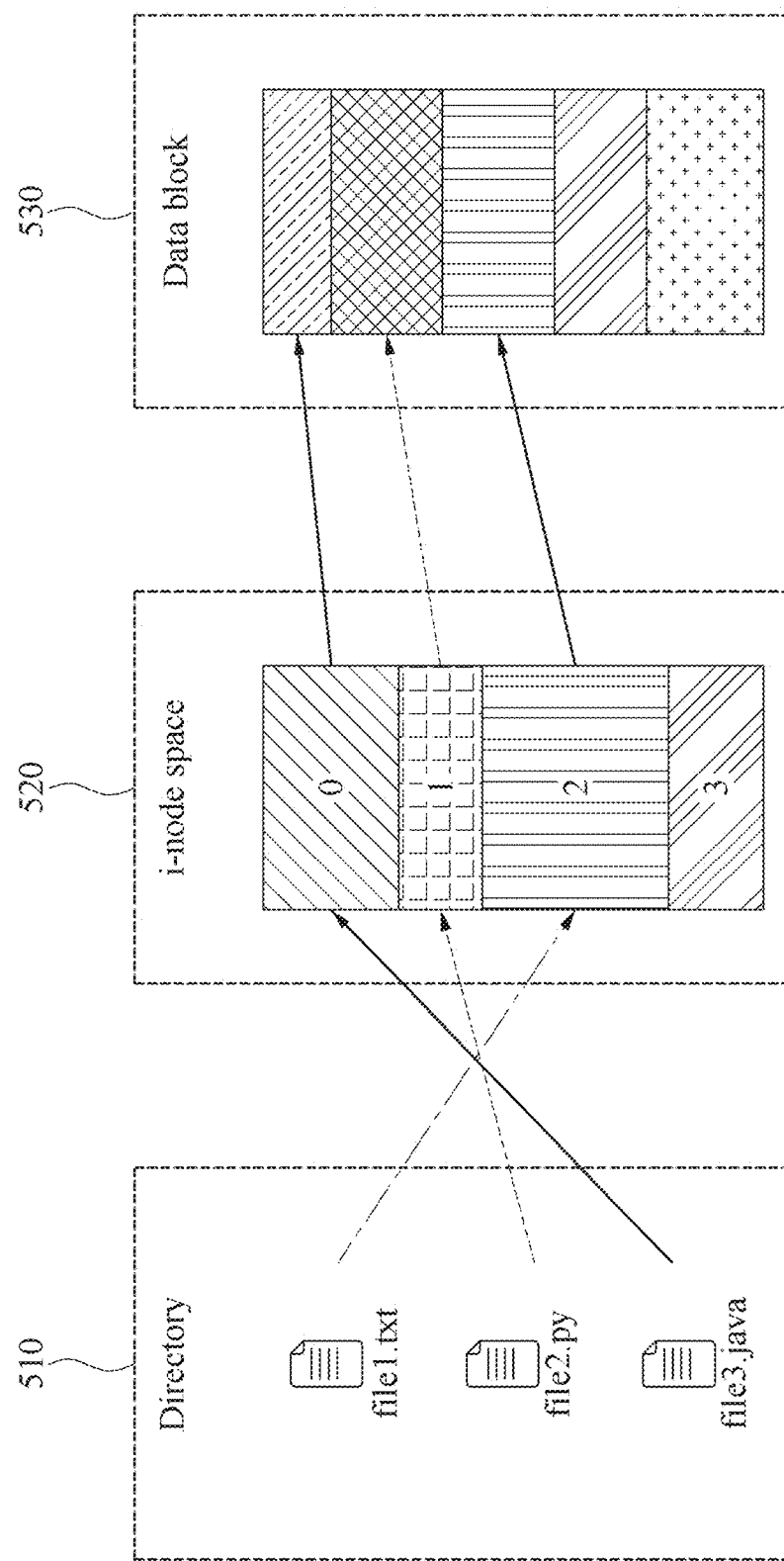
FIG. 5 is a diagram illustrating a structure of a file according to an example embodiment.

FIG. 5 is a diagram illustrating a structure of a file according to an example embodiment. Referring to FIG. 5, a hierarchical structure 500 of a file in an example embodiment is illustrated.

A processing process in an OS (e.g., the OS 142 of FIGS. 1 and 2) of an electronic device (e.g., the electronic device 101 of FIG. 1 and the electronic device 300 of FIG. 3) according to an example embodiment may be, for example, configured in the unit of file. The file may have, for example, a characteristic of the hierarchical structure 500 of FIG. 5.

The file may include, for example, a filename 510, an i-node space 520, and a data block 530. The filename 510 may correspond to an element required for a user to distinguish, access, and manipulate a file. As a hardware device is managed by a file, all processing processes in an OS may need to be processed through a single interface, which is the file. Accordingly, the filename 510 may need to be distinguished to handle the file. Directories corresponding to different files may be distinguished by the filename 510.

The i-node space 520 may store an i-node. An i-node may be referred to as an index node and for example, may correspond to a data structure used in a file system shown in FIG. 6 below. All files and directories may each have one i-node 520.

The i-node space 520 may be an example of a space for storing a file attribute of an original file. In this case, the file attribute may include, for example, an archive attribute, a hidden attribute, a system attribute, and a read only attribute, but the example is not limited thereto.

The archive attribute may be an attribute assigned when a file is newly generated or is changed and may be used to inform that the file is not backed up or the file is an original copy. The hidden attribute may be used to hide a file. The system attribute may be used to emphasize that the file is a system file. The read only attribute may be used to inform that only reading the file is allowed and writing, modifying, and deleting the file are not allowed.

For ease of description, in an example embodiment, a description is provided mainly based on an i-node and/or an i-node space. However, the example is not limited thereto and the file attribute of the original file may be stored in various types, such as storing in a form of a combination of a directory entry with an i-node space, such as a file allocation table (FAT) file system.

The i-node space 520 may describe a file, and for example, may include information, such as a data location (address) of an actual file in the data block 530, a type of the file, an ownership (a user or a group) of the file, a permission of the file, an access mode of the file, and a timestamp (last modified date) of the file. However, the example is not limited thereto. The i-node space 520 may occupy, for example, about 1% of the total storage space.

For example, one i-node space 520 may be generated whenever one file is generated by a file system and an i-node number corresponding to the generated i-node space 520 may be assigned. The i-node number may be a unique identification number and may start from 0 for each partition. For example, the i-node space 520 may be generated at a location where the number of links is 0, and after storing information, a value of the link may be changed to 1. The i-node may be, for example, stored in the i-node space 520, but the example is not limited thereto.

The data block 530 may correspond to a space in which content of an actual file is stored. For example, when a file is stored in a memory (e.g., the memory 130 of FIG. 1, the memory 350 of FIG. 3, and the storage device 670 of FIG. 6), data may be sequentially stored in the data block 530 without specific distinction. Since file data is not specifically distinguished when the file data is stored in the data block 530, a method may be needed to distinguish which portion is data for which file. In this case, information indicating which portion of the data block 530 is data for which file may be stored in the i-node space 520.

Figure 6:
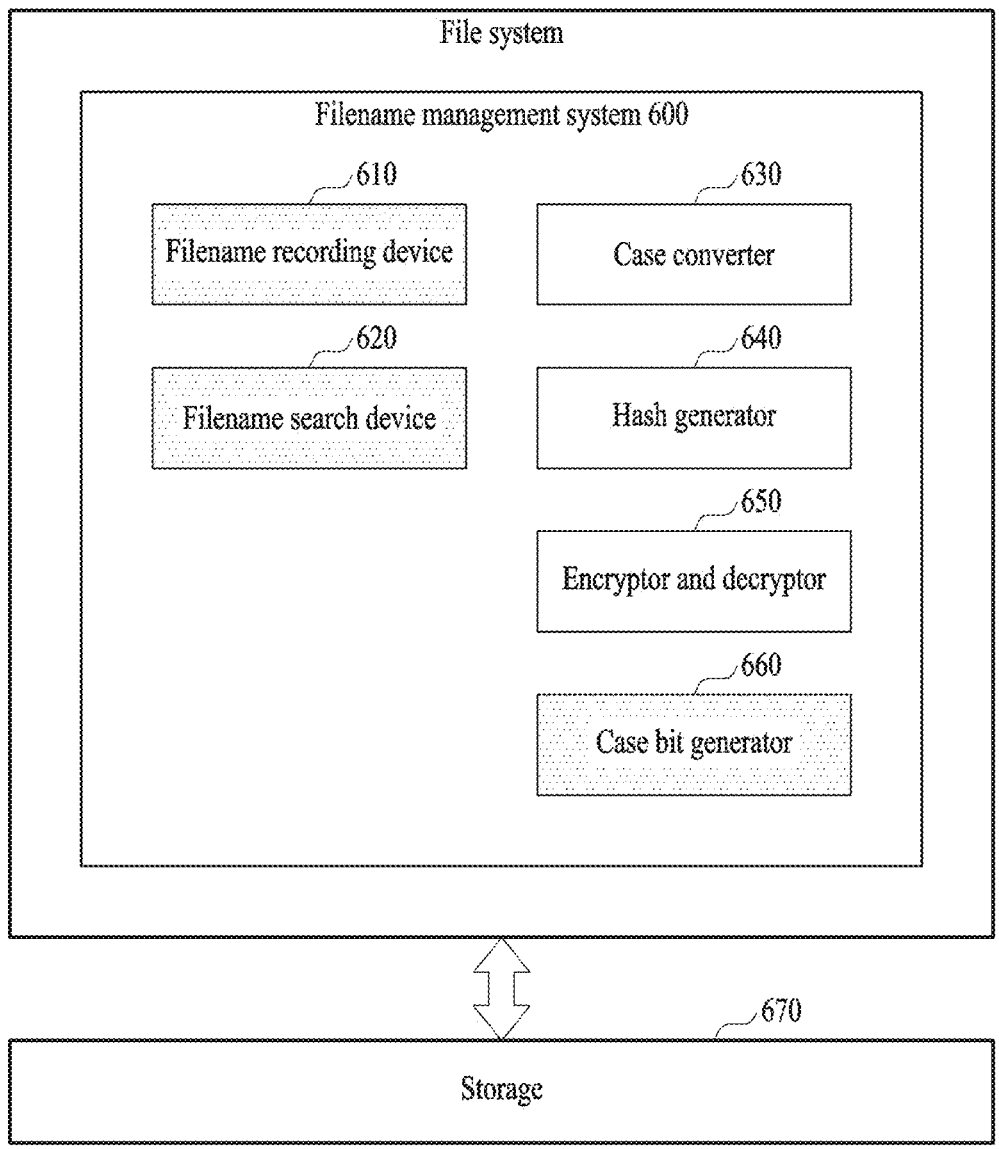
FIG. 6 is a block diagram illustrating a structure of a file system according to an example embodiment.

FIG. 6 is a block diagram illustrating a structure of a file system according to an example embodiment. Referring to FIG. 6, a file system according to an example embodiment may include a filename management system 600 for managing a filename. In this case, for example, the file system may be included in an OS (e.g., the OS 142 of FIGS. 1 and 2) of the electronic device (e.g., the electronic device 101 of FIG. 1 and the electronic device 300 of FIG. 3) described above and may be configured as a separate file.

The filename management system 600 may include, for example, a filename recording device 610, a filename search device 620, a case converter 630, a hash generator 640, an encryptor and decryptor 650, a case bit (case_bits) generator 660, and a storage device 670 (e.g., the memory 130 of FIG. 1 and/or the memory 350 of FIG. 3). However, the example is not limited thereto.

For example, the filename management system 600 may request the filename recording device 610 to record a filename (e.g., a case exact (CE) filename) of an original file with filename metadata (e.g., filename metadata 810 of FIG. 8A) corresponding to the filename in the storage device 670.

The filename recording device 610 may generate a CI filename consisting of or including lowercase letters by using the case converter 630. The CI filename may be represent "d as "c" _name ".

The case converter 630 may convert a character string of the filename of the original file input to the filename management system 600 into all uppercase letters or all lowercase letters. For example, when the filename of the original fi" e is "Hello" onkey", the case converter 630 may generate a CI fil" name "hello" onkey" corresponding to the fil "name "Hello" onkey" of the original file. When the filename of the original fi "e is "HELLO"onkey", a CI fil "name "hello"

onkey" corresponding to the fil "name "Hello" onkey" of the original file may be identically generated.

The hash generator 640 may generate a hash value corresponding to a CI filename encrypted by the encryptor and decryptor 650. For example, when the hash generator 640 is a 16-bit hash generator, a hash value for an encrypted CI filename may be generated as a 16-bit value, such as ""x1234"". In another example, when the hash generator 640 is a 32-bit hash generator, a hash value for an encrypted CI filename may be generated as a 32-bit value, su "h as "0x12"45678". The hash value may vary depending on a hash algorithm used by the hash generator 640.

The encryptor and decryptor 650 may encrypt a character string (e.g., the CI filename) converted by the case converter 630 or may decrypt an encrypted character string. The CI filename encrypted by the encryptor and decryptor 650 may be represent "d as "en" _name". For example, when the CI filena"e is "hello" onkey", the encrypted CI filename may be generat"d as "qwc?^xto&o"p % % de". In an example embodiment, a length of a CI filename may be 11 characters and a length of an encrypted CI filename may be 16 characters. The length of the CI filename and the length of the encrypted CI filename may be the same or different from each other. The length of the encrypted CI filename may vary depending on an encryption algorithm used by the encryptor and decryptor 650.

The case bit generator 660 may generate a state of uppercase and lowercase letters of a filename of an input original file as a bitstream. For example, the case bit generator 660 may convert an uppercase letter included in the filename of the input original file into ""it "1" and may convert a lowercase letter included in the filename of the original file into ""it "0". Depending on the embodiment, the case bit generator 660 may convert an uppercase letter included in the filename of the input original file into ""it "O" and may convert a lowercase letter included in the filename of the original file into ""it "1".

For example, the filename management system 600 may request the filename search device 620 to search for whether a filename, which is the same as a filename to be searched for, exists in filenames stored in the storage device 670. In this case, the filename search device 620 may generate a CI filename (e.g., a first CI filename) using the case converter 630 described above, may generate an encrypted CI filename (e.g., a first encrypted CI filename) using the encryptor and decryptor 650, and may generate a hash value (e.g., a first hash value) corresponding to the encrypted CI filename using the hash generator 640.

The filename search device 620 may verify whether hash values (e.g., a second hash value or a third hash value) recorded in the storage device 670 coincide with a hash value (e.g., the first hash value) generated by the hash generator 640. When the first hash value coincides with the second hash value, the filename search device 620 may compare an encrypted CI filename (e.g., enc_name, a second or third encrypted CI filename) recorded in the storage device 670 with the first encrypted CI filename. When the comparison result coincides, the filename search device 620 may reconstruct the original filename (e.g., the CE filename) in which uppercase and lowercase letters of the first CI filename are converted by using the case converter 630.

When the comparison result between the first encrypted CI filename and the second encrypted CI filename does not coincide, the filename search device 620 may search for a file having the filename to be found by iteratively performing the process described above on all files stored in the storage device 670.

Figure 7:
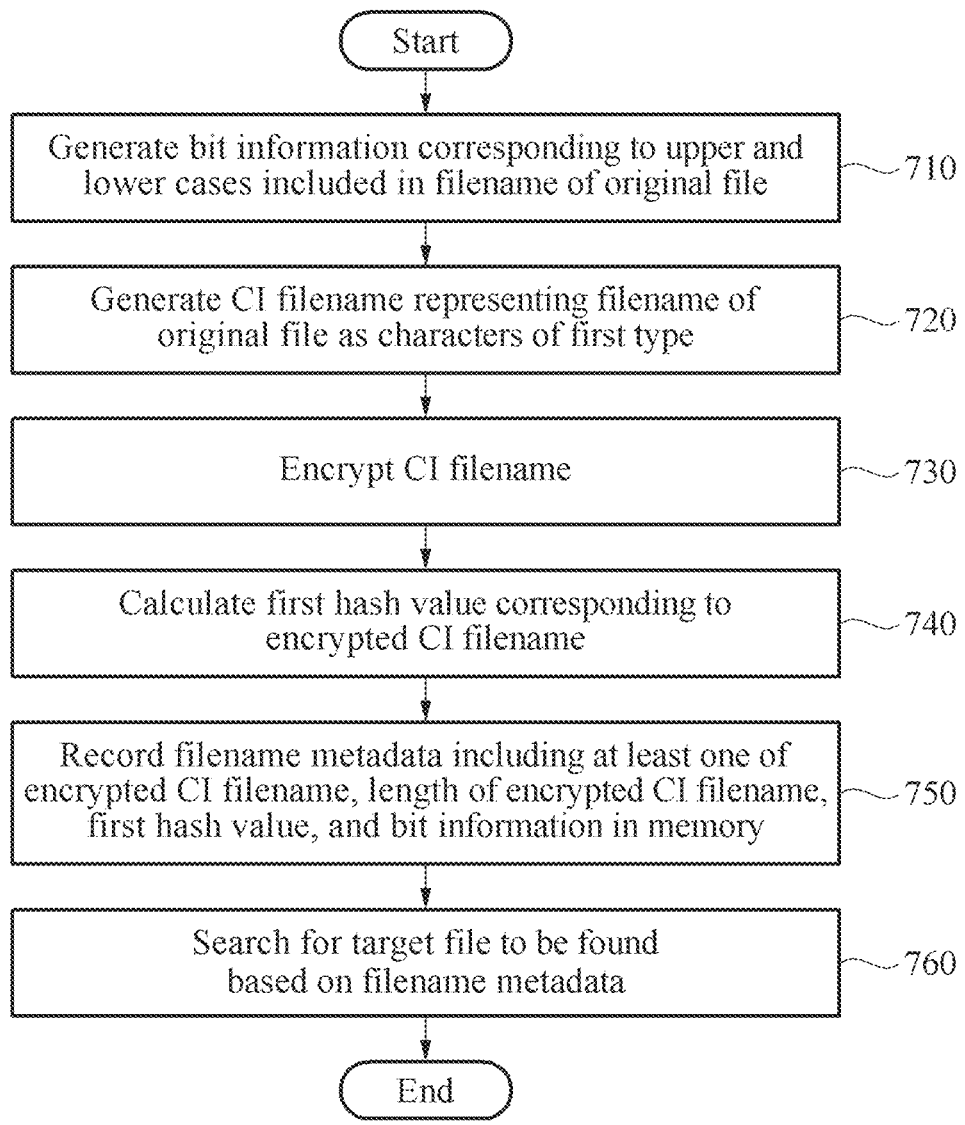
FIG. 7 is a flowchart illustrating an operating method of an electronic device according to an example embodiment.

FIG. 7 is a flowchart illustrating an operating method of an electronic device according to an example embodiment. Operations to be described hereinafter may be sequentially performed but not necessarily. For example, the order of the operations may change, and at least two of the operations may be performed in parallel.

Referring to FIG. 7, an electronic device (e.g., the electronic device 101 of FIG. 1 and the electronic device 300 of FIG. 3) according to an example embodiment may generate and store a target file or may search for a stored file through operations 710 to 760.

In operation 710, the electronic device 300 may generate bit information corresponding to uppercase and lowercase letters included in a filename (e.g., a "filename of an original file") of an original file. For example, when a request for recording an original file in a memory (e.g., the memory 130 of FIG. 1, the memory 350 of FIG. 3, and/or the storage device 670 of FIG. 6) is received, the electronic device 300 may generate a bitstream as bit information using the case bit generator 660 described above, wherein the bitstream may correspond to uppercase and lowercase letters included in the filename of the original file. For example, when the filename of the original file is "HELLOmonkey", the electronic device 300 may generate bit information such as a bitstream (e.g., "11111000000") by allocating a first bit value (e.g., bit "1") to each of the uppercase letters "HELLO" and allocating a second bit value (e.g., bit "0") to each of the lowercase letters "monkey". An example embodiment of a method of the electronic device 300 to generate bit information corresponding to uppercase and lowercase letters included in a filename of an original file is further described with reference to FIG. 8B below.

In operation 720, the electronic device 300 may generate a CI filename in which the filename of the original file is expressed by characters of a first type. For example, the electronic device 300 may generate a CI filename corresponding to the filename of the original file, such as the case converter 630 described above.

For example, the characters of the first type may be "lowercase" letters. In this case, the electronic device 300 may generate a CI filename "hellomonkey" in which the filename "HelloMonkey" of the original file is expressed by the characters (e.g., lowercase letters) of the first type. For example, when uppercase and lowercase letters of the filename of the original file are different, such as "HELLOmonkey", the same CI filename "hellomonkey" corresponding to the filename "HELLOmonkey" of the original file may be generated.

Depending on the embodiment, the characters of the first type may be "uppercase" letters. In this case, the electronic device 300 may generate a CI filename "HELLOMONKEY" in which the filename "HelloMonkey" of the original file is expressed by the characters (e.g., uppercase letters) of the first type. In another example, when the filename of the original file is "HELLOmonkey", the CI filename may be identically generated as "HELLOMONKEY".

In operation 730, the electronic device 300 may encrypt the CI filename generated in operation 720. For example, when the CI filename is "hellomonkey", the encrypted CI filename may be generated as "qwc?^xto&otp % % de". In an example embodiment, a length of an encrypted CI filename may vary depending on an encryption algorithm used by the electronic device 300.

In operation 740, the electronic device 300 may calculate a first hash value corresponding to the encrypted CI filename (e.g., "qwc?^xto&otp % % de") in operation 730. For example, when a hash function used by the electronic device 300 is a 16-bit hash function, a hash value for an encrypted CI filename may be generated as a 16-bit value, such as "0x1234". In another example, when a hash function used by the electronic device 300 is a 32-bit hash function, a hash value for an encrypted CI filename may be generated as a 32-bit value, such as "0x12345678". The first hash value calculated by the electronic device 300 may vary depending on a hash algorithm used by the electronic device 300.

In operation 750, the electronic device 300 may record filename metadata including at least one of the bit information generated in operation 710, the encrypted CI filename and the length of the encrypted CI filename in operation 730, and the first hash value calculated in operation 740, in the memory. In this case, the bit information may be stored as a bitstream as shown in FIG. 8B below or may be stored in an encrypted form. For example, when encrypting in a 2 bit right rotate method that rotates original bit information by 2 bits in a right direction, original bit information "100001000000" may be encrypted as "001000010000". An example of the filename metadata according to an example embodiment is further described with reference to FIG. 8A below.

In operation 760, the electronic device 300 may search for a target file to be found based on the filename metadata. The method of searching for a target file is further described with reference to FIG. 9 below.

Figure 8A:
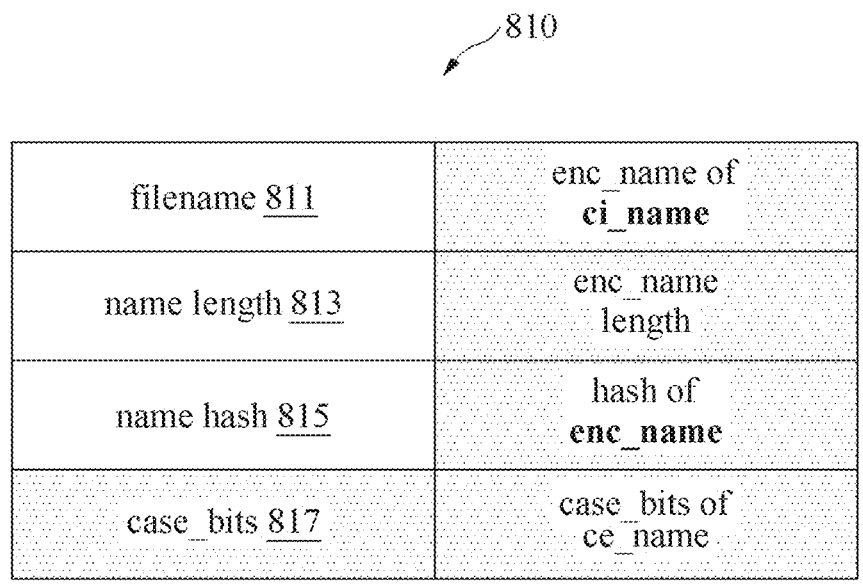
FIG. 8A is a diagram illustrating an example of filename metadata according to an example embodiment.
Figure 8B:
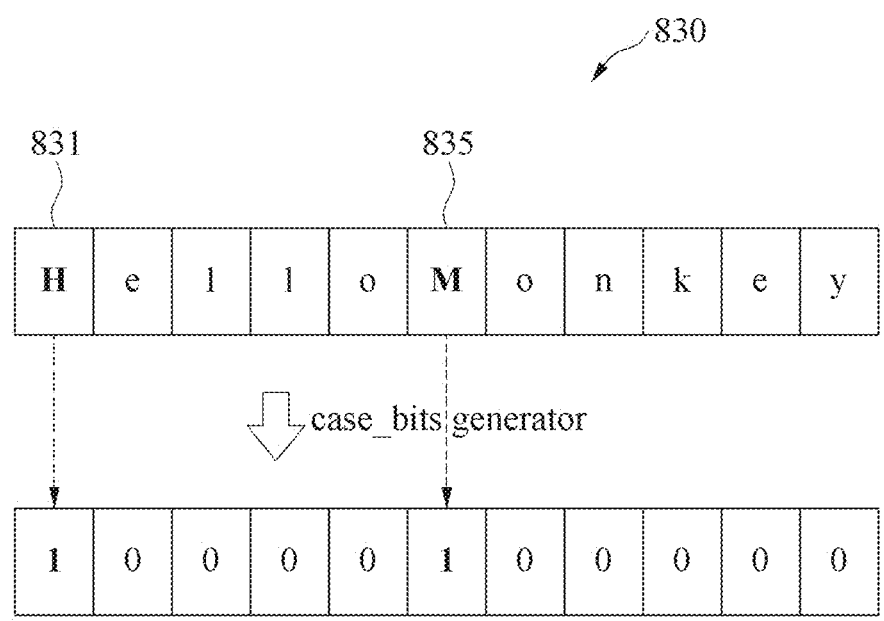
FIG. 8B is a diagram illustrating a method of generating bit information according to an example embodiment.

FIG. 8A is a diagram illustrating an example of filename metadata according to an example embodiment and FIG. 8B is a diagram illustrating a method of generating bit information according to an example embodiment.

For example, it may be assumed that an electronic device (e.g., the electronic device 101 of FIG. 1 and the electronic device 300 of FIG. 3) records a filename "HelloMonkey" of an original file in a memory (e.g., the memory 130 of FIG. 1, the memory 350 of FIG. 3, and the storage device 670 of FIG. 6). In this case, a CI filename expressed by characters (e.g., lowercase letters) of a first type may be "hellomonkey" and the CI filename may be encrypted as "qwc?^xto&otp % % de" by an encryption algorithm.

In this case, the following information may be stored in filename metadata 810 recorded in the storage device 670 in relation to the filename of the original file. The encrypted CI filename "qwc?^xto&otp % % de" may be stored in a filename item 811 of the filename metadata 810 and "16", which is the length of the encrypted CI filename "qwc?^xto&otp % % de", may be stored in a filename length (name length) item 813. "0x12345678", which is a hash value corresponding to the encrypted CI filename, may be stored in a filename hash (name hash) item 815, and bit information "10000100000" corresponding to uppercase and lowercase letters of the filename of the original file may be stored in a case bit item 817.

An example embodiment of a method of converting bit information stored in the case bit item 817 is further described with reference to FIG. 8B below.

To summarize, the filename metadata as 810, such [qwc?^xto&otp % % de: 16:0x12345678: 10000100000], in correspondence to the filename "HelloMonkey" of the original file may be recorded in the memory.

Alternatively, when the filename of the original file is "Welcome" or "OldAndNewWorld", the filename metadata 810, such as [r823jf@#F2903wed: 16:0x95de1509: 1000000] or [f309j882f #!%! #r112dr #!$r@ #2rwr23: 32:0x3edfe7ba: 10010010010000], may be recorded in the memory 350 as described above.

Depending on the embodiment, a 16-bit hash generator (e.g., the hash generator 640 of FIG. 6) and a case bit generator (e.g., the case bit generator 660 of FIG. 6) that allocates a second bit value (e.g., bit "0") in correspondence to a position of an uppercase letter and allocates a first bit value (e.g., bit "1") in correspondence to a position of a lowercase letter may be used. In this case, the filename metadata 810, such as [qwc?^xto&otp % % de: 16:0x1234: 01111011111], in correspondence to the filename "HelloMonkey" of the original file may be recorded in the memory 350. In addition, in correspondence to the filename "Welcome" of the original file, the filename metadata 810, such as [r823jf@ #F2903wed: 16:0x95de: 0111111], may be stored and in correspondence to the filename "OldAndNewWorld" of the original file, the filename metadata 810, such as [f309j882f #!%! #r112dr #!$r@ #2rwr23: 32:0x3edf: 01101101101111], may be stored.

Depending on the embodiment, the electronic device 300 may encrypt the bit information in a 2 bit right rotate method in addition to the 16-bit hash generator 640 and the case bit generator 660 that allocates the second bit value (e.g., bit "0") in correspondence to the position of the uppercase letter and allocates the first bit value (e.g., bit "1") in correspondence to the position of the lowercase letter. In this case, in correspondence to the filename "HelloMonkey" of the original file, filename metadata, such as [qwc?^xto&otp % % de: 16:0x1234: 11011110111], may be stored and in correspondence to the filename "Welcome" of the original file, filename metadata, such as [r823jf@ #F2903wed: 16:0x95de: 1101111], may be stored in the memory 350. In addition, in correspondence to the filename "OldAndNewWorld" of the original file, filename metadata, such as [f309j882f #!%! #r112dr #!$r@ #2rwr23: 32:0x3edf: 11011011011011], may be stored in the memory 350.

In an example embodiment, the filename metadata 810 may be, for example, recorded in a metadata area of the file system or in the memory 350, but the example is not limited thereto.

For example, when the filename metadata 810 is recorded in the memory 350, the filename metadata 810 may be recorded in the same metadata area in the file system or the memory 350 or the filename metadata 810 may be divided and recorded in different metadata areas based on each item or each attribute of the filename metadata 810.

Depending on the embodiment, the filename metadata 810 may be recorded in a directory entry area of the file system. In this case, information corresponding to the filename item 811, the filename length (name length) item 813, and the filename hash (name hash) item 815 of the metadata 810 may be recorded in the directory entry area of the file system and bit information corresponding to the case bit item 817 may be separately recorded in a space (e.g., the i-node space 520 of FIG. 5) for storing a file attribute of the original file or an extra attributes space.

Referring to FIG. 8B, bit information corresponding to a filename "HelloMonkey" of an original file according to an example embodiment is illustrated.

For example, when the filename of the original file is "HelloMonkey", the electronic device 300 may generate bit information like a bitstream (e.g., "10000100000") by allocating a first bit value (e.g., bit "1") to an uppercase letter H 831 at a first position in the filename and an uppercase letter M 835 at a sixth position in the file name and allocating a second bit value (e.g., bit "0") to lowercase letters at remaining positions. Accordingly, the bit information corresponding to the filename "HelloMonkey" of the original file may be "10000100000".

Depending on the embodiment, the electronic device 300 may allocate the second bit value (e.g., bit "0") to an uppercase letter included in the filename of the original file and may allocate the first bit value (e.g., bit "1") to a lowercase letter. For example, when the filename of the original file is "HelloMonkey", the electronic device 300 may generate bit information "01111011111" by allocating the second bit value (e.g., bit "0") to the uppercase letters H and M and allocating the first bit value (e.g., bit "1") to the remaining lowercase letters.

Figure 9:
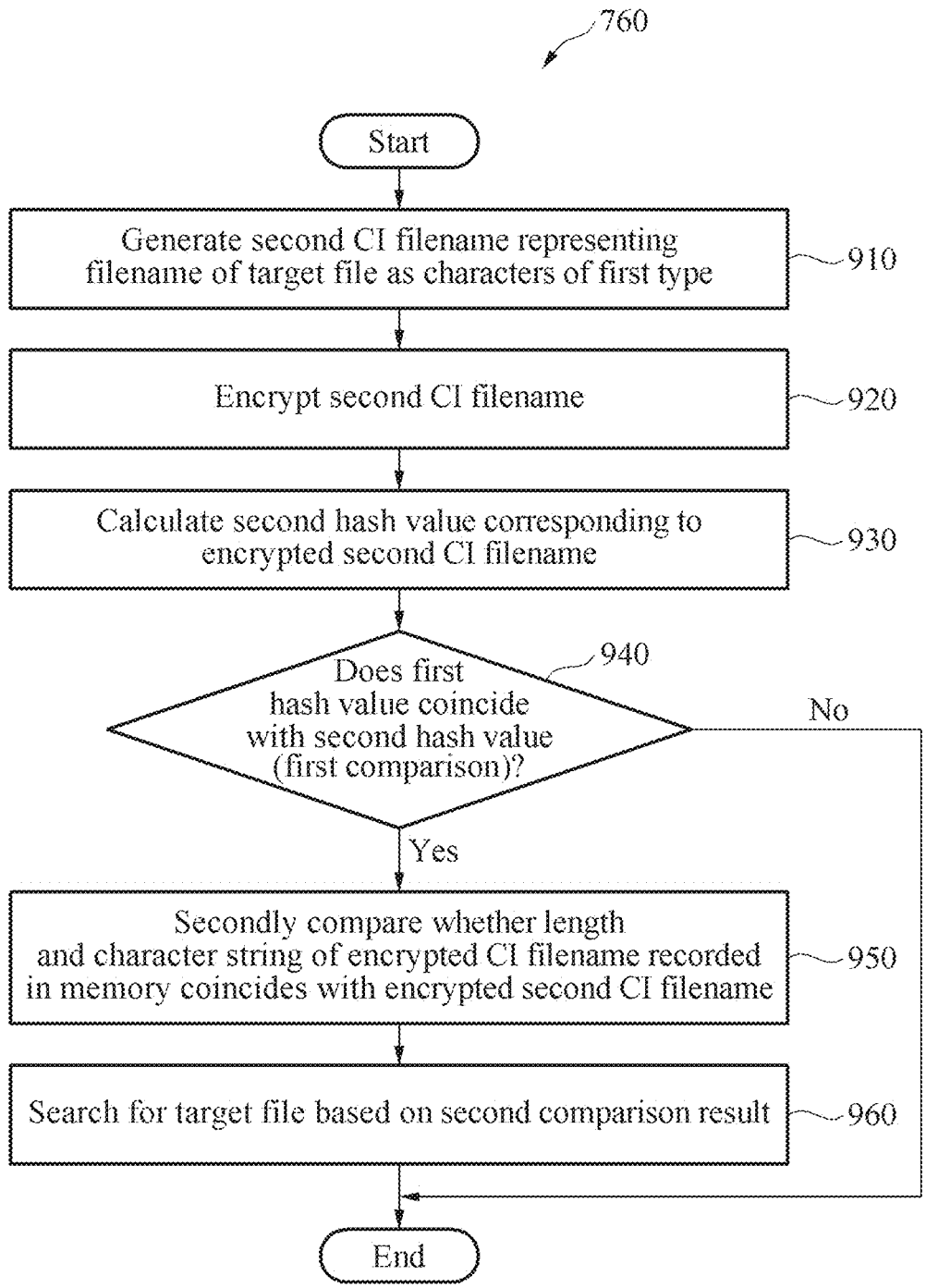
FIG. 9 is a flowchart illustrating a method of searching for a target file according to an example embodiment.

FIG. 9 is a flowchart illustrating a method of searching for a target file according to an example embodiment. Processes to be described hereinafter may be sequentially performed but not necessarily. For example, the order of the processes may change, and at least two of the processes may be performed in parallel.

Referring to FIG. 9, an electronic device (e.g., the electronic device 101 of FIG. 1, the electronic device 300 of FIG. 3, the processor 120 of FIG. 1, and the processor 330 of FIG. 3) according to an example embodiment may search for a target file to be found through operations 910 to 960.

In operation 910, the electronic device 300 may generate a second CI filename in which a filename of the target file is expressed by characters of a first type. In this case, the "second CI filename" may correspond to a CI filename corresponding to the filename of the target file for which a search request is received.

In operation 920, the electronic device 300 may encrypt the second CI filename generated in operation 910.

In operation 930, the electronic device 300 may calculate a second hash value corresponding to the second CI filename encrypted in operation 920.

In operation 940, the electronic device 300 may perform a first comparison whether the first hash value calculated in operation 740 described above coincides with the second hash value calculated in operation 930.

In operation 950, the electronic device 300 may search for the target file based on a first comparison result of operation 940. For example, when the first comparison result coincides, the electronic device 300 may perform a second comparison whether file lengths and character strings of the CI filename encrypted through operation 730 recorded in a memory (e.g., the memory 130 of FIG. 1, the memory 350 of FIG. 3, and/or the storage device 670 of FIG. 6) and the second CI filename encrypted in operation 920 coincide with each other. The electronic device 300 may search for the target file based on a second comparison result.

For example, when the second comparison result coincides, the electronic device 300 may reconstruct the filename of the original file by converting a character of the CI filename corresponding to an order of bits included in the bit information into an uppercase letter or a lowercase letter according to the bit information. On the other hand, when the second comparison result does not coincide, the electronic device 300 may iteratively compare whether hash values corresponding to the remaining filenames stored in the memory 350 coincide with the second hash value. When a third hash value, which is one of hash values corresponding to the remaining filenames stored in the memory 350 coincides with the second hash value, by performing a third comparison whether filename lengths and character strings of an encrypted third CI filename corresponding to the third hash value and the encrypted second CI filename coincide, the electronic device 300 may iteratively compare whether the hash values corresponding to the remaining filenames coincide with the second hash value.

Figure 10:
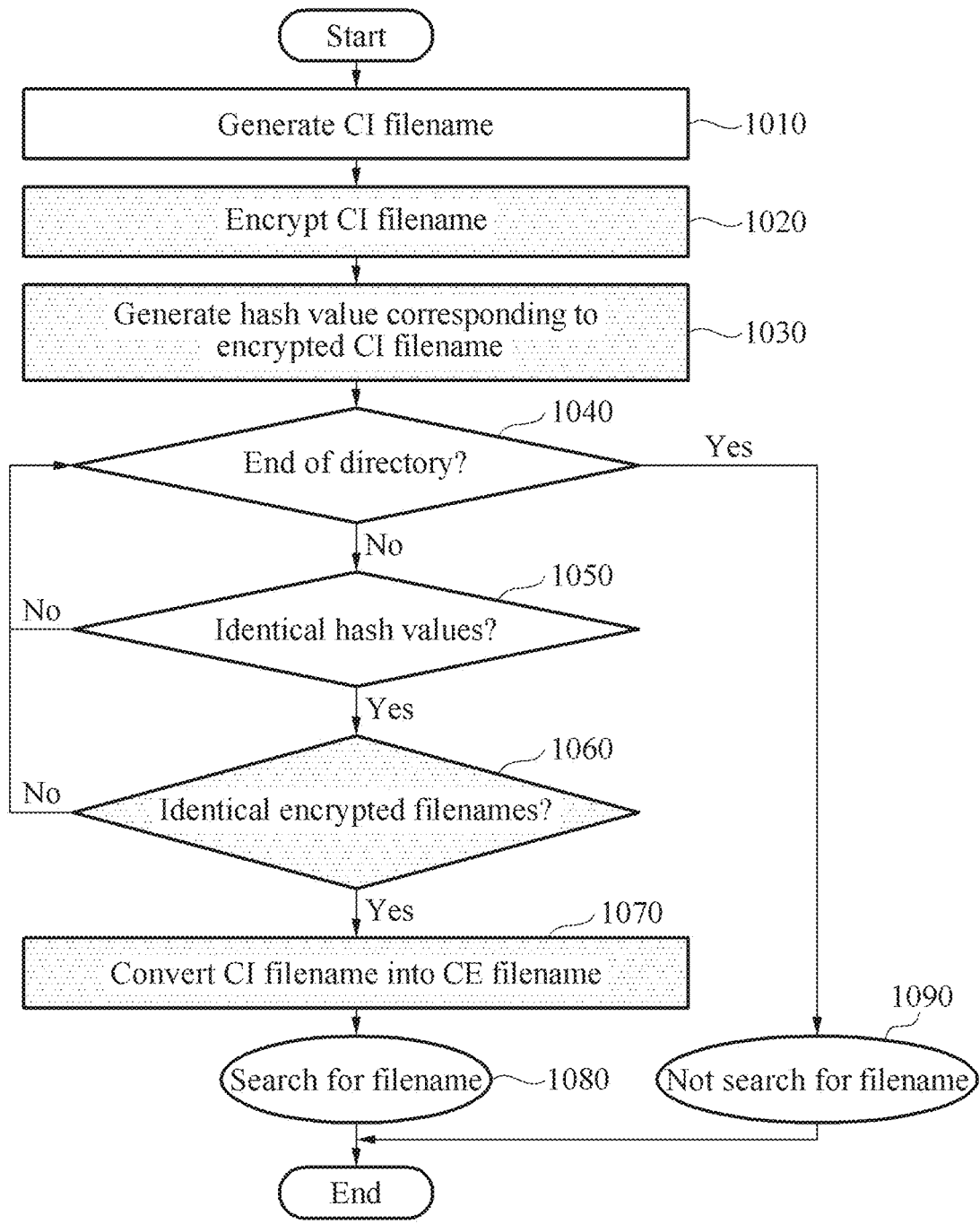
FIG. 10 is a flowchart illustrating a method of searching for a filename according to an example embodiment.

FIG. 10 is a flowchart illustrating a method of searching for a filename according to an example embodiment. Operations to be described hereinafter may be sequentially performed but not necessarily. For example, the order of the operations may change, and at least two of the operations may be performed in parallel.

Referring to FIG. 10, an electronic device (e.g., the electronic device 101 of FIG. 1, the electronic device 300 of FIG. 3, the processor 120 of FIG. 1, and the processor 330 of FIG. 3) that receives a search request for whether a filename of a target file to be found exists in filenames stored in a memory (e.g., the memory 130 of FIG. 1, the memory 350 of FIG. 3, and/or the storage device 670 of FIG. 6) may search for a filename through operations 1010 to 1090.

In operation 1010, the electronic device 300 may generate a CI filename (e.g., a second CI filename) corresponding to a filename of a target file for which a search request is received. In this case, the second CI filename may express the filename of the target file by characters (e.g., lowercase letters) of a first type. For example, when the filename of the target file is "HelloMonkey", the CI filename (e.g., the second CI filename) corresponding to the filename of the target file may be "hellomonkey" in which the filename of the target file is converted into all lowercase letters.

In operation 1020, the electronic device 300 may encrypt the CI filename (e.g., the second CI filename) generated in operation 1010, for example, like the case convertor 630 described above. For example, when the CI filename (e.g., the second CI filename) is "hellomonkey", the encrypted filename (e.g., the encrypted second CI filename) may be generated as "qwc?^xto&otp % % de".

In operation 1030, the electronic device 300 may generate a hash value (e.g., the second hash value) corresponding to the filename (e.g., the second CI filename) encrypted in operation 1030.

In operation 1040, the electronic device 300 may determine whether an end of a directory recorded in the memory 350 is reached. When it is determined that the end of the directory recorded in the memory 350 is reached, in operation 1090, the electronic device 300 may output a message "file not found" to inform that the target file is not found.

When it is determined that the end of the directory recorded in the memory 350 is not reached in operation 1040, in operation 1050, the electronic device 300 may compare whether hash values recorded in the memory 350 coincide with the hash value generated in operation 1030. When a comparison result of operation 1050 does not coincide, the electronic device 300 may repeat operations 1050 and 1060 until all files are searched for through operation 1040.

When the comparison result of operation 1050 coincides, in operation 1060, the electronic device 300 may compare whether the filename (e.g., the second CI filename) encrypted in operation 1020 coincides with the encrypted filename recorded in the memory 350. More specifically, the electronic device 300 may compare whether filename lengths and character strings of the filename (e.g., the second CI filename) encrypted in operation 1020 and the encrypted filename recorded in the memory 350 coincide with each other.

When a comparison result of operation 1060 does not coincide, the electronic device 300 may repeat operations 1050 and 1060 until all files are searched for through operation 1040.

When the comparison result of operation 1060 coincides, the electronic device 300 may consider that the same filename is found and in operation 1070, the electronic device 300 may convert the CI filename generated in operation 1010 into a CE filename. For example, the electronic device 300 may reconstruct a CE filename of the original file by using the CI filename and the bit information recorded in the memory 350. For example, when a CI filename "hellomonkey" and bit information "10000100000" corresponding to the CI filename are generated by allocating a first bit value (e.g., bit "1") in correspondence to a position of an uppercase letter included in a filename of the original file "HelloMonkey" and allocating a second bit value in correspondence to a position of a lowercase letter included in the filename of the original file, the electronic device 300 may reconstruct the original filename "HelloMonkey" by changing h and m at positions where the bit information is "1" to H and M, respectively, and maintaining the rest in lowercase letters.

Figure 11:
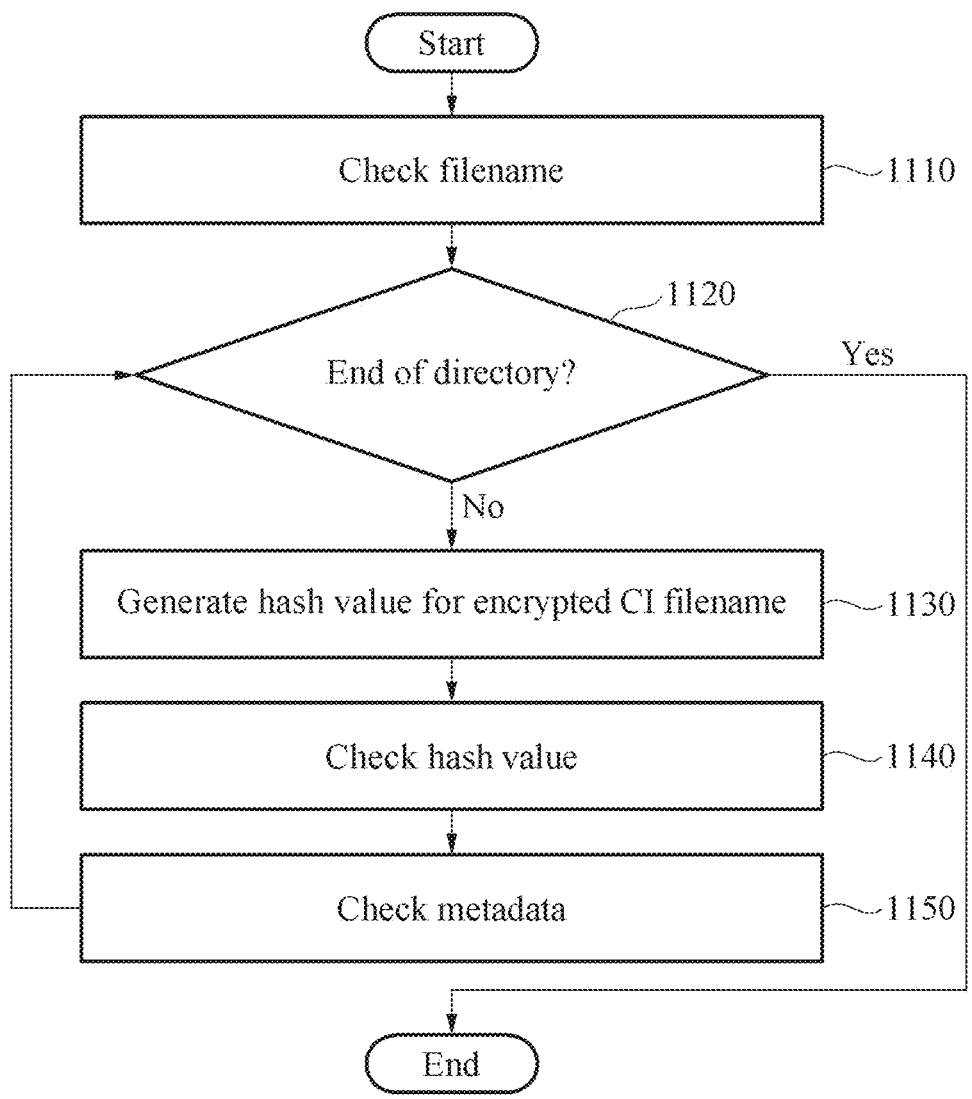
FIG. 11 is a flowchart illustrating a method of verifying a filename according to an example embodiment.

FIG. 11 is a flowchart illustrating a method of verifying a filename according to an example embodiment. Operations to be described hereinafter may be sequentially performed but not necessarily. For example, the order of the operations may change, and at least two of the operations may be performed in parallel.

Referring to FIG. 11, an electronic device (e.g., the electronic device 101 of FIG. 1, the electronic device 300 of FIG. 3, the processor 120 of FIG. 1, and the processor 330 of FIG. 3) according to an example embodiment may verify a filename through operations 1110 to 1150. According to an example embodiment, since a hash value may be calculated without an encryption key, the corruption of the filename may be verified by checking a hash value for a CI filename.

In operation 1110, the electronic device 300 may verify a filename. For example, the electronic device 300 may verify a filename stored in a tree structure in a memory (e.g., the memory 130 of FIG. 1, the memory 350 of FIG. 3, and/or the storage device 670 of FIG. 6).

In operation 1120, the electronic device 300 may determine whether an end of a directory stored in the memory 350 is reached. In this case, "the end of the directory stored in the memory 350" may be construed as the completion of verification of all filenames stored in the memory 350. When it is determined that the end of the directory is reached in operation 1120, the electronic device 300 may terminate a verification operation.

On the other hand, when it is determined that the end of the directory is reached in operation 1120, in operation 1130, the electronic device 300 may generate a hash value for an encrypted CI filename included in filename metadata (e.g., the filename metadata 810 of FIG. 8A).

In operation 1140, the electronic device 300 may check the corruption of the hash value by comparing the hash value generated in operation 1130 with the hash value stored in the filename metadata 810. In addition, when the hash value is corrupted, the electronic device 300 may update the hash value stored in the filename metadata 810 with the hash value generated in operation 1130.

In operation 1150, the electronic device 300 may verify various feature values possessed by the file including the filename metadata 810 by using pre-stored file attribute information.

When the check is completed in operation 1150, the electronic device 300 may iteratively perform verification on the corruption of the filenames stored in the memory 350 through operation 1120.

For example, in correspondence to the original filename "HelloMonkey", [qwc?^xto&otp % % de: 16:0x12345678: 10000100000] may be stored as the filename metadata 810 in the memory 350. In this case, due to 1 bit flip, a hash value "0x12345678" stored in the filename metadata 810 may be corrupted as "0x123456f8". In this case, the electronic device 300 may calculate a hash value (e.g., "0x12345678") for the encrypted CI filename "qwc?^xto&otp % % de" included in the filename metadata 810. The electronic device 300 may identify the corruption of data through a hash value check by comparing the hash value "0x12345678" for the encrypted CI filename "qwc?^xto&otp % % de" with the corrupted hash value "0x123456f8" included in the filename metadata 810. The electronic device 300 may prevent or reduce data loss by recovering the corrupted hash value "0x123456f8" to "0x12345678" by the calculated hash value "0x12345678".

According to an example embodiment, the electronic device 101 or 301 may include the communication interface 310, comprising communication circuitry, configured to receive an original file, the memory 130, 350, or 670, and at least one processor 120 and/or 330 comprising processing circuitry, and the at least one processor 120 and/or 330 individually and/or collectively may generate bit information corresponding to uppercase and lowercase letters included in a filename of the original file, may generate a CI filename in which the filename of the original file is expressed by characters of a first type, may encrypt the CI filename, may calculate a first hash value corresponding to the encrypted CI filename, may record filename metadata 810 including at least one of the encrypted CI filename, a length of the encrypted CI filename, the first hash value, and the bit information, in the memory 130, 350, or 670, and may search for a target file to be found based on the filename metadata.

According to an example embodiment, the processor 120 or 330 may generate the bit information by allocating a first bit value in correspondence to a position of an uppercase letter included in the filename of the original file and allocating a second bit value in correspondence to a position of a lowercase letter included in the filename of the original file.

According to an example embodiment, the characters of the first type may include one of uppercase and lowercase letters.

According to an example embodiment, the processor 120 or 330 may record the filename metadata 810 in a different metadata area in the memory 130, 350, or 670 based on an attribute of the filename metadata 810, or may store the filename metadata 810 in a same metadata area in the memory 130, 350, or 670.

According to an example embodiment, in the filename metadata 810, the processor 120 or 330 may record the encrypted CI filename, the length of the encrypted CI filename, and the first hash value in a directory entry area of the original file, and in the filename metadata 810, may separately record the bit information in a space for storing a file attribute of the original file or an extra attributes space.

According to an example embodiment, the processor 120 or 330 may generate a second CI filename in which a filename of the target file is expressed by the characters of the first type, may encrypt the second CI filename, may calculate a second hash value corresponding to the encrypted second CI filename, may perform a first comparison whether the first hash value coincides with the second hash value, and may search for the target file based on a result of the first comparison.

According to an example embodiment, when the result of the first comparison coincides, the processor 120 or 330 may perform a second comparison whether filename lengths and character strings of the encrypted CI filename recorded in the memory 130, 350, or 670 and the encrypted second CI filename coincide with each other, and may search for the target file based on a result of the second comparison.

According to an example embodiment, when the result of the second comparison coincides, the processor 120 or 330 may reconstruct the filename of the original file, and when the result of the second comparison does not coincide, may iteratively compare whether hash values corresponding to remaining filenames stored in the memory 130, 350, or 670 coincide with the second hash value.

According to an example embodiment, when the result of the second comparison coincides, based on the bit information, the processor 120 or 330 may reconstruct the filename of the original file by converting a character of the CI filename corresponding to an order of bits included in the bit information into an uppercase letter or a lowercase letter according to the bit information.

According to an example embodiment, when the result of the second comparison does not coincide, the processor 120 or 330 may, when a third hash value, which is one of the hash values, coincides with the second hash value, perform a third comparison whether filename lengths and character strings of an encrypted third CI filename corresponding to the third hash value and the encrypted second CI filename coincide with each other.

According to an example embodiment, a method of operating the electronic device 101 or 301 may include operation 710 of generating bit information corresponding to uppercase and lowercase letters included in a filename of an original file, operation 720 of generating a CI filename in which the filename of the original file is expressed by characters of a first type, operation 730 of encrypting the CI filename, operation 740 of calculating a first hash value corresponding to the encrypted CI filename, operation 750 of recording the filename metadata 810 including at least one of the encrypted CI filename, a length of the encrypted CI filename, the first hash value, and the bit information, in the memory 130, 350, or 670, and operation 760 of searching for a target file to be found based on the filename metadata.

According to an example embodiment, the generating of the bit information may include generating the bit information by allocating a first bit value in correspondence to a position of an uppercase letter included in the filename of the original file and allocating a second bit value in correspondence to a position of a lowercase letter included in the filename of the original file.

According to an example embodiment, the recording of the filename metadata 810 in the memory 130, 350, or 670 may further include recording the filename metadata 810 in a different metadata area in the memory 130, 350, or 670 based on an attribute of the filename metadata, and storing the filename metadata 810 in a same metadata area in the memory 130, 350, or 670.

According to an example embodiment, the operating method of the electronic device 101 or 300 may further include at least one of: in the filename metadata 810, recording the encrypted CI filename, the length of the encrypted CI filename, and the first hash value in a directory entry area of the original file, and in the filename metadata 810, separately recording the bit information in an i-node space of the original file or an extra attributes space.

According to an example embodiment, operation 670 of searching for the target file may include operation 910 of generating a second CI filename in which a filename of the target file is expressed by the characters of the first type, operation 920 of encrypting the second CI filename, operation 930 of calculating a second hash value corresponding to the encrypted second CI filename, operation 940 of performing a first comparison whether the first hash value coincides with the second hash value, and an operation of searching for the target file based on a result of the first comparison.

According to an example embodiment, when the result of the first comparison coincides, the searching for the target file may include operation 950 of performing a second comparison whether filename lengths and character strings of the encrypted CI filename recorded in the memory 130, 350, or 670 and the encrypted second CI filename coincide with each other, and operation 960 of searching for the target file based on a result of the second comparison.

According to an example embodiment, when a result of the second comparison coincides, the searching for the target file may include based on the bit information, reconstructing the filename of the original file by converting a character of the CI filename corresponding to an order of bits included in the bit information into an uppercase letter or a lowercase letter according to the bit information.

According to an example embodiment, when the result of the second comparison does not coincide, the searching for the target file may include iteratively comparing whether hash values corresponding to remaining filenames stored in the memory 130, 350, or 670 coincide with the second hash value.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:
1. An electronic device comprising:
communication interface, comprising communication circuitry, configured to receive data;
memory; and
at least one processor comprising processing circuitry and operably connected to the communication circuitry and the memory, the at least one processor, individually and/or collectively, configured to:
receive an original file from another device using the communication interface,
based on receiving the original file, store the original file in the memory and generate bit information corresponding to uppercase and lowercase letters comprised in a filename of the original file by allocating a first bit value in correspondence to a position of an uppercase letter comprised in the filename of the original file and allocating a second bit value in correspondence to a position of a lowercase letter comprised in the filename of the original file,
generate a case insensitive (CI) filename in which the filename of the original file is expressed by at least characters of a first type,
encrypt the CI filename,
calculate a first hash value corresponding to the encrypted CI filename,
record filename metadata comprising the encrypted CI filename, a length of the encrypted CI filename, the first hash value, and the bit information, in the memory, and
in response to a request for a target file:
generate a second CI filename in which a filename of the target file is expressed by the characters of the first type, calculate a second hash value corresponding to an encryption of the second CI filename, and search for the target file by comparing the second hash value with the first hash value included in the filename metadata stored in the memory.

2. The electronic device of claim 1, wherein the encryption of the CI filename includes using block encryption and/or stream encryption.

3. The electronic device of claim 1, wherein the characters of the first type comprise at least one of uppercase and lowercase letters.

4. The electronic device of claim 1, wherein the at least one processor configured to:
record the filename metadata in a different metadata area in the memory based on an attribute of the filename metadata, and/or
store the filename metadata in a same metadata area in the memory.

5. The electronic device of claim 1, wherein the at least one processor configured to:
in the filename metadata, record the encrypted CI filename, the length of the encrypted CI filename, and the first hash value in a directory entry area of the original file, and
in the filename metadata, separately record the bit information in a space for storing a file attribute of the original file and/or an extra attributes space.

6. The electronic device of claim 1, wherein the at least one processor configured to:
perform a first comparison whether the first hash value coincides with the second hash value, and
search for the target file based on a result of the first comparison.

7. The electronic device of claim 6, wherein the at least one processor configured to, when the result of the first comparison coincides, perform a second comparison whether filename lengths and character strings of the encrypted CI filename recorded in the memory and the encrypted second CI filename coincide with each other, and search for the target file based on a result of the second comparison.

8. The electronic device of claim 7, wherein the at least one processor configured to:
when the result of the second comparison coincides, reconstruct the filename of the original file, and
when the result of the second comparison does not coincide, iteratively compare whether hash values corresponding to remaining filenames stored in the memory coincide with the second hash value.

9. The electronic device of claim 8, wherein, when the result of the second comparison coincides, at least one processor configured to, based on the bit information, reconstruct the filename of the original file by converting a character of the CI filename corresponding to an order of bits comprised in the bit information into an uppercase letter or a lowercase letter according to the bit information.

10. The electronic device of claim 8, wherein, when the result of the second comparison does not coincide, at least one processor configured to, when a third hash value, which is one of the hash values, coincides with the second hash value, perform a third comparison whether filename lengths and character strings of an encrypted third CI filename corresponding to the third hash value and the encrypted second CI filename coincide with each other.

11. A method of operating an electronic device, the method comprising:

receiving an original file from another device using communication interface comprising communication circuitry;
based on receiving the original file, storing the original file in a memory and generating bit information corresponding to uppercase and lowercase letters comprised in a filename of an original file by allocating a first bit value in correspondence to a position of an uppercase letter comprised in the filename of the original file and allocating a second bit value in correspondence to a position of a lowercase letter comprised in the filename of the original file;
generating a case insensitive (CI) filename in which the filename of the original file is expressed at least by characters of a first type;
encrypting the CI filename;
calculating a first hash value corresponding to the encrypted CI filename;
recording filename metadata comprising the encrypted CI filename, a length of the encrypted CI filename, the first hash value, and the bit information, in the memory; and
in response to a request for a target file:
generating a second CI filename in which a filename of the target file is expressed by the characters of the first type;
calculating a second hash value corresponding to an encryption of the second CI filename; and
searching for the target file by comparing the second hash value with the first hash value included in the filename metadata stored in the memory.

12. The method of claim 11, wherein the encryption of the CI filename includes using block encryption and/or stream encryption.

13. The method of claim 11, wherein the recording of the filename metadata in the memory comprises:
recording the filename metadata in a different metadata area in the memory based on an attribute of the filename metadata; and
storing the filename metadata in a same metadata area in the memory.

14. The method of claim 11, further comprising at least one of:
in the filename metadata, recording the encrypted CI filename, the length of the encrypted CI filename, and the first hash value in a directory entry area of the original file; and
in the filename metadata, separately recording the bit information in an i-node space of the original file or an extra attributes space.

15. The method of claim 11, wherein the searching for the target file comprises:
performing a first comparison whether the first hash value coincides with the second hash value;
when the result of the first comparison coincides, performing a second comparison whether filename lengths and character strings of the encrypted CI filename recorded in the memory and the encrypted second CI filename coincide with each other;
when a result of the second comparison coincides, based on the bit information, reconstructing the filename of the original file by converting a character of the CI filename corresponding to an order of bits comprised in the bit information into an uppercase letter or a lowercase letter according to the bit information; and when the result of the second comparison does not coincide, iteratively comparing whether hash values corresponding to remaining filenames stored in the memory coincide with the second hash value.

* * * * *